United States Patent
Chen et al.

(10) Patent No.: US 8,233,235 B2
(45) Date of Patent: Jul. 31, 2012

(54) PMR WRITER HAVING A TAPERED WRITE POLE AND BUMP LAYER AND METHOD OF FABRICATION

(75) Inventors: Yingjian Chen, Fremont, CA (US); Liubo Hong, San Jose, CA (US); Yimin Hsu, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 348 days.

(21) Appl. No.: 12/634,514

(22) Filed: Dec. 9, 2009

(65) Prior Publication Data

US 2011/0134568 A1 Jun. 9, 2011

(51) Int. Cl.
*G11B 5/147* (2006.01)
*G11B 5/23* (2006.01)

(52) U.S. Cl. ........... 360/125.15; 360/125.3; 29/603.16

(58) Field of Classification Search ........... 360/125.03, 360/125.06, 125.08, 125.11, 125.12, 125.15, 360/125.3; 29/603.07, 603.16
See application file for complete search history.

(56) References Cited

U.S. PATENT DOCUMENTS

| | | | |
|---|---|---|---|
| 4,807,076 A | 2/1989 | Nakashima et al. | |
| 6,693,768 B1 | 2/2004 | Crue et al. | |
| 7,006,326 B2 | 2/2006 | Okada et al. | |
| 7,042,682 B2 | 5/2006 | Hu et al. | |
| 7,159,302 B2 | 1/2007 | Feldbaum et al. | |
| 7,180,705 B2 | 2/2007 | Matono et al. | |
| 7,212,379 B2 | 5/2007 | Hsu et al. | |
| 7,245,454 B2 | 7/2007 | Aoki et al. | |
| 7,248,437 B2 | 7/2007 | Yazawa et al. | |
| 7,249,407 B2 * | 7/2007 | Kobayashi | 29/603.14 |
| 7,251,878 B2 | 8/2007 | Le et al. | |
| 7,253,991 B2 | 8/2007 | Fontana, Jr. et al. | |
| 7,253,992 B2 | 8/2007 | Chen et al. | |
| 7,324,304 B1 | 1/2008 | Benakli et al. | |
| 7,327,533 B2 | 2/2008 | Guan | |
| 7,343,668 B2 | 3/2008 | Kobayashi | |
| 7,365,942 B2 | 4/2008 | Sasaki et al. | |
| 7,375,925 B2 | 5/2008 | Sasaki et al. | |

(Continued)

FOREIGN PATENT DOCUMENTS

EP 1835489 A2 9/2007

(Continued)

OTHER PUBLICATIONS

Lijie Guan, Joe Smyth, Moris Dovek, Sui-Yan Chan, and Tatsuya Shimizu, A Trailing Shield Perpendicular Writer Design With Tapered Write Gap for High Density Recording, IEEE Transactions on Magnetics, Nov. 2008, pp. 3396-3399, vol. 44, No. 11.

(Continued)

*Primary Examiner* — Jefferson Evans
(74) *Attorney, Agent, or Firm* — Patterson & Sheridan, LLP (57) ABSTRACT

Methods for fabrication of tapered magnetic poles with a non-magnetic front bump layer. A magnetic pole may have a tapered surface at or near an air bearing surface (ABS), wherein a thickness of the write pole increases in a direction away from the ABS. A non-magnetic front bump layer may be formed on the tapered surface of the magnetic pole and away from the ABS. The front bump layer may increase the separation distance between a shield layer and the magnetic pole near the tapered surface, thereby improving the performance of the write head.

20 Claims, 12 Drawing Sheets

U.S. PATENT DOCUMENTS

| | | |
|---|---|---|
| 7,394,621 B2 | 7/2008 | Li et al. |
| 7,417,824 B2 | 8/2008 | Kameda |
| 7,417,825 B2 | 8/2008 | Sasaki et al. |
| 7,430,095 B2 | 9/2008 | Benakli et al. |
| 7,436,628 B2 | 10/2008 | Kameda et al. |
| 7,440,230 B2 | 10/2008 | Hsu et al. |
| 7,443,633 B2 | 10/2008 | Tagami et al. |
| 7,457,080 B2 | 11/2008 | Watabe et al. |
| 7,995,307 B2 * | 8/2011 | Zheng ................. 360/125.13 |
| 2005/0219743 A1 | 10/2005 | Guan et al. |
| 2005/0219747 A1* | 10/2005 | Hsu et al. .................. 360/126 |
| 2007/0285837 A1 | 12/2007 | Im et al. |
| 2008/0019045 A1 | 1/2008 | Otagiri et al. |
| 2008/0297953 A1* | 12/2008 | Matono et al. ............. 360/319 |
| 2008/0316653 A1 | 12/2008 | Sasaki et al. |
| 2009/0059426 A1 | 3/2009 | Sasaki et al. |
| 2009/0103211 A1* | 4/2009 | Chen et al. ........... 360/125.03 |
| 2009/0122445 A1 | 5/2009 | Jiang et al. |
| 2009/0297946 A1 | 12/2009 | Yue et al. |
| 2010/0157476 A1* | 6/2010 | Kudo et al. ........... 360/125.12 |
| 2010/0172054 A1* | 7/2010 | Yamaguchi et al. .... 360/125.03 |
| 2011/0134569 A1 | 6/2011 | Allen et al. |
| 2011/0135959 A1 | 6/2011 | Hong |
| 2011/0135962 A1 | 6/2011 | Hong et al. |

FOREIGN PATENT DOCUMENTS

| | | |
|---|---|---|
| JP | 3209609 A | 9/1991 |
| JP | 6329311 A | 11/1994 |
| JP | 2009076127 A | 4/2009 |

OTHER PUBLICATIONS

Hitachi Corporation and Jeffrey Lille, Non-magnetic metrology layer for perpendicular pole, IP.com Prior Art Database Technical Disclosure, Sep. 27, 2004, IP.com Electronic Publication IPCOM000031484D.

IBM TDB, T. J. Beaulieu and R. W. Wood, Improved Perpendicular Recording Head, IP.com Prior Art Database Technical Disclosure, Jan. 30, 2005, IP.com Electronic Publication IPCOM000037905D.

IBM TDB and T. A. Schwartz, Perpendicular Recording Read Write Head With High Reluctance Leg, IP.com Prior Art Database Technical Disclosure, original publication date: Sep. 1, 1981, IP.com Electronic Publication IPCOM000053181D dated Feb. 12, 2005.

S. Wang, E. Louis, J. Wolfson, R. Anderson, and M. H. Kryder, A Perpendicular Contact Recording Head with High Moment Laminated FeAin/NiFe Pole Tips, IEEE Transactions on Magnetics, Nov. 1994, pp. 3897-3899, vol. 30, No. 6.

\* cited by examiner

PMR WRITER HAVING A TAPERED WRITE POLE AND BUMP LAYER AND METHOD OF FABRICATION

BACKGROUND OF THE INVENTION

1. Field of the Invention

Embodiments of the present invention generally relate to magnetic write heads, and more specifically to fabrication of magnetic write heads with tapered magnetic poles.

2. Description of the Related Art

Magnetic head-based systems have been widely accepted in the computer industry as a cost-effective form of data storage. In a magnetic disk drive system, a magnetic recording medium in the form of a disk rotates at high speed while a magnetic head "flies" slightly above the surface of the rotating disk. The magnetic disk is rotated by means of a spindle drive motor. The magnetic head is attached to or formed integrally with a "slider" which is suspended over the disk by a suspension assembly which in turn is attached to an actuator arm. As the magnetic disk rotates at an operating speed, the moving air generated by the rotating disk in conjunction with the physical design of the slider lifts the magnetic head, allowing it to glide or "fly" slightly above and over the disk surface on a cushion of air, referred to as an air bearing.

Magnetic disks are desirable mediums of storage because they are nonvolatile; i.e., no power is required to preserve the data. There has been increasing progress in the field of magnetic disk storage system technology in recent years. Such success has made storage systems an important component of modern computers. Some of the most important customer attributes of any storage system are the cost per megabyte, data rate, and access time. Improvements in areal density (the amount of information that can be placed within a given area on a disk drive), have been the chief driving force behind the historic improvement in storage cost. In fact, the areal density of magnetic disk storage systems continues to increase. As the magnetic particles that make up recorded data on a magnetic disk become ever smaller, technical difficulties in writing and reading such small bits occur.

Perpendicular recording is one approach to achieve larger areal densities when compared with longitudinal recording. In recent years, increased demand for higher data rate and areal density has driven the perpendicular head design to scale toward smaller dimensions and has resulted in a need for constant exploration of new head designs, materials, and practical fabrication methods.

Some of the problems encountered with perpendicular recording are side writing and side erasure to adjacent tracks on the disk. These problems occur from leakage and fringing of the magnetic flux from the magnetic write head. To minimize these effects, one approach is to provide either a trailing or wrap-around shield on the magnetic write head. These shields allow effective magnetic flux to be provided for writing to the disk, while avoiding leakage and fringing that can lead to the above-described problems. As the areal density of the disks increases, however, the ability of existing shields to achieve the desired results decreases.

SUMMARY OF THE INVENTION

The present invention generally relates to magnetic write heads, and more specifically to fabrication of magnetic write heads with tapered magnetic poles.

One embodiment of the invention provides method of fabricating a magnetic head. The method generally comprises forming a write pole on a substrate, and patterning a first non-magnetic layer on the write pole, wherein the first non-magnetic layer exposes a portion of the write pole proximate an air bearing surface (ABS) end of the magnetic head. The method further comprises milling the exposed portion of the write pole to form a tapered region of the write pole, wherein the thickness of the tapered region of the write pole increases in a direction away from the ABS, and depositing a second non-magnetic layer on at least part of the tapered region of the write pole. The method also comprises patterning the second non magnetic layer to form a non-magnetic bump layer, wherein the bump layer is adjacent to a portion of the tapered region and a sidewall portion of the first non-magnetic layer.

Another embodiment of the invention provides another method for fabricating a magnetic head. The method generally comprises patterning a flared write pole on a substrate using a damascene process, the write pole comprising a flare point, wherein a width of the write pole increases from a first width to a greater widths in a direction away from an air bearing surface (ABS) end of the magnetic head, and patterning a first non-magnetic layer on the write pole, wherein the first non-magnetic layer exposes a portion of the write pole proximate the ABS end. The method further comprises milling the exposed portion of the write pole to form a tapered region of the write pole, wherein the thickness of the tapered region of the write pole increases in a direction away from the ABS, and depositing a second non-magnetic layer on at least part of the tapered region of the write pole. The method also comprises patterning the second non magnetic layer to form a bump layer, wherein the bump layer is adjacent to a portion of the tapered region and a sidewall portion of the first non-magnetic layer.

Yet another embodiment of the invention provides a magnetic head, generally comprising a write pole comprising a tapered region and a non-tapered region, wherein a thickness of the tapered region of the write pole increases in a direction away from an air bearing surface (ABS) end of the magnetic head, and a first non-magnetic layer formed on the non-tapered region of the magnetic pole. The magnetic head further comprises a non-magnetic bump layer formed on the tapered region, wherein the non-magnetic bump layer is adjacent to a sidewall portion of the first non-magnetic layer, and a second non-magnetic layer formed on a portion of the tapered region of the write pole that is not covered by the bump layer. The magnetic head also comprises a shield layer, wherein the shield layer is separated from the write pole by at least the second non-magnetic layer and the bump layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention are generally related to magnetic write heads, and more specifically to fabrication of tapered magnetic poles with a non-magnetic front bump layer. A magnetic pole may have a tapered surface at or near an air bearing surface (ABS), wherein a thickness of the write pole increases in a direction away from the ABS. A non-magnetic front bump layer may be formed on the tapered surface of the magnetic pole and away from the ABS. The front bump layer may increase the separation distance between a shield layer and the magnetic pole near the tapered surface, thereby improving the performance of the write head.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
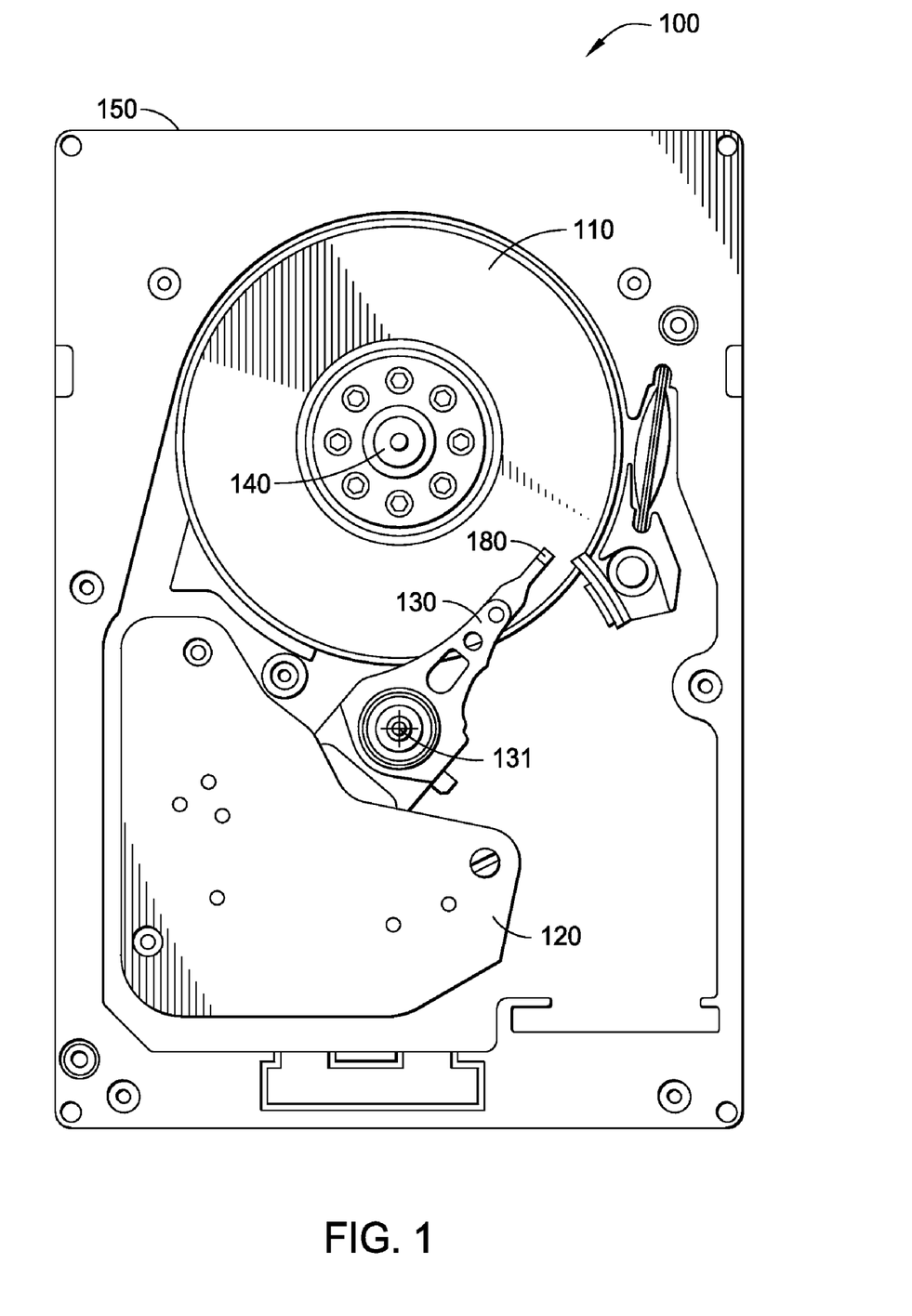
FIG. 1 illustrates an exemplary magnetic disk drive, according to an embodiment of the invention.

FIG. 1 illustrates a top view of an exemplary hard disk drive (HDD) 100, according to an embodiment of the invention. As illustrated, HDD 100 may include one or more magnetic disks 110, actuator 120, actuator arms 130 associated with each of the magnetic disks, and spindle motor 140 affixed in a chassis 150. The one or more magnetic disks 110 may be arranged vertically as illustrated in FIG. 1. Moreover, the one or more magnetic disks may be coupled with the spindle motor 140.

Magnetic disks 110 may include circular tracks of data on both the top and bottom surfaces of the disk. An electromagnetic head 180 may be positioned on a track. As each disk spins, data may be written and/or read from the data track. Electromagnetic head 180 may be coupled to an actuator arm 130 as illustrated in FIG. 1. Actuator arm 130 may be configured to swivel around actuator axis 131 to place electromagnetic head 180 on a particular data track.

A plurality of magnetic disks may be stacked vertically in HDD 100. Each disk may have read and write tracks on each side of the disk. Therefore, electromagnetic heads may be placed on both sides of the disk. In some embodiments, a single magnetic head may be configured to access data tracks on the bottom face of a first disk and a top face of a second disk.

Each actuator arm 130 may be coupled to actuator 120. Actuator 120 may be a motor configured to control the swiveling movement of actuator arm 130 to place electromagnetic head 180 on a given data track. In one embodiment, the actuator arms may be connected. Therefore, all the actuator arms 130, and consequently all the electromagnetic heads 180 may move together.

Spindle motor 140 may be configured to rotate the magnetic disks at a predetermined rate. For example, the spindle motor 140 may be configured to spin at a rate of 10,000 revolutions per minute (rpm). One skilled in the art will recognize however, that any reasonable spin rate may be employed. The spin rate for example may depend on the type of disk drive, the type of computer, etc.

Figure 2A:
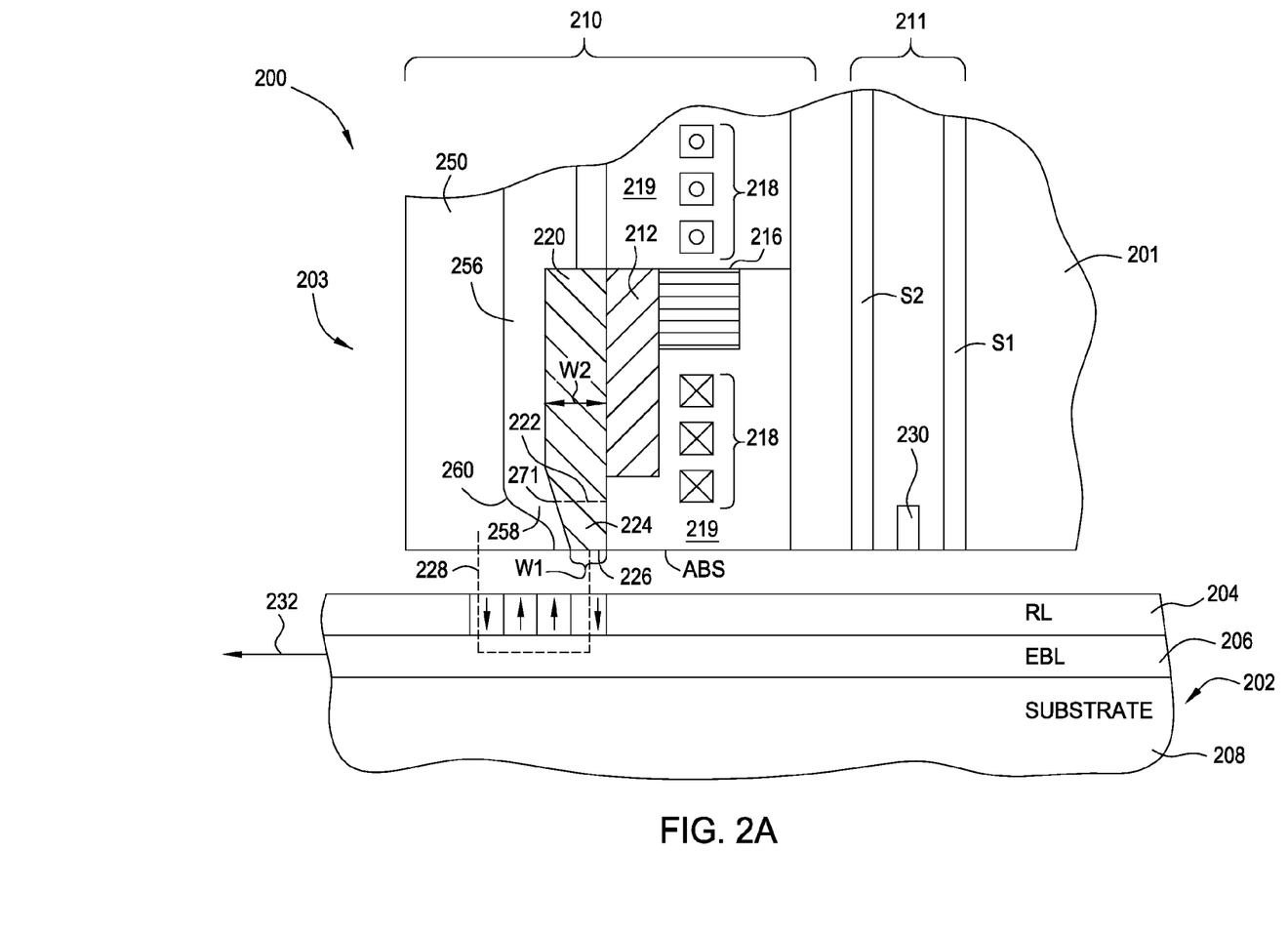
FIG. 2A is a side view of a read/write head and magnetic disk of the disk drive of FIG. 1, according to one embodiment of the invention

FIG. 2A is a fragmented, cross-sectional side view through the center of an embodiment of a read/write head 200 mounted on a slider 201 and facing magnetic disk 202. The read/write head 200 and magnetic disk 202 may correspond to the electromagnetic head 180 and magnetic disk 110, respectively in FIG. 1. In some embodiments, the magnetic disk 202 may be a "dual-layer" medium that includes a perpendicular magnetic data recording layer (RL) 204 on a "soft" or relatively low-coercivity magnetically permeable underlayer (EPL) 206 formed on a disk substrate 208. The read/write head 200 includes an air bearing surface (ABS), a magnetic write head 210 and a magnetic read head 211, and is mounted such that its ABS is facing the magnetic disk 202. In FIG. 2A, the disk 202 moves past the write head 210 in the direction indicated by the arrow 232, so the portion of slider 201 that supports the read/write head 200 is often called the slider "trailing" end 203.

In some embodiments, the magnetic read head 211 is a magnetoresistive (MR) read head that includes an MR sensing element 230 located between MR shields S1 and S2. The RL 204 is illustrated with perpendicularly recorded or magnetized regions, with adjacent regions having magnetization directions, as represented by the arrows located in the RL 204. The magnetic fields of the adjacent magnetized regions are detectable by the MR sensing element 230 as the recorded bits.

The write head 210 includes a magnetic circuit made up of a main pole 212 and a yoke 216. The write head 210 also includes a thin film coil 218 shown in the section embedded in non-magnetic material 219 and wrapped around yoke 216. In an alternative embodiment, the yoke 216 may be omitted, and the coil 218 may wrap around the main pole 212. A write pole 220 (also referred to herein as "WP 220") is magnetically connected to the main pole 212 and has an end 226 that defines part of the ABS of the magnetic write head 210 facing the outer surface of disk 202.

Figure 2B:
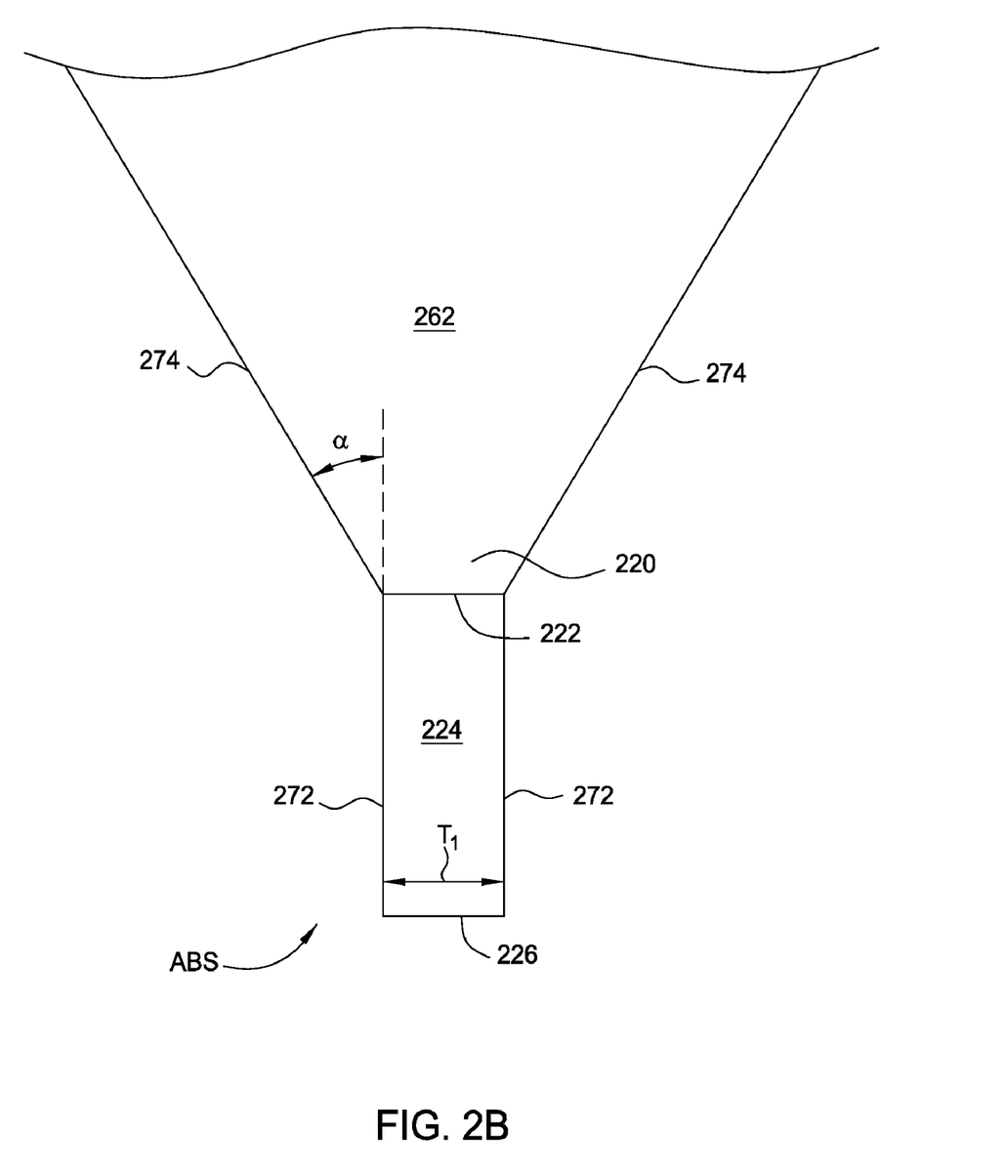
FIG. 2B is an enlarged top view of a portion of the read/write head of FIG. 2A, according to a further embodiment of the invention.

In some embodiments, write pole 220 is a flared write pole and includes a flare point 222 and a pole tip 224 that includes an end 226 that defines part of the ABS. In flared write pole embodiments, the width of the write pole 220 in a first direction (into and out of the page in FIG. 2A) increases from a first width at the flare point 222 to greater widths away from the ABS, as is shown in FIG. 2B. The flare may extend the entire height of write pole 220 (i.e., from the end 226 of the write pole 220 to the top of the write pole 220), or may only extend from the flare point 222, as shown in FIG. 2A. In one embodiment the distance between the flare point 222 and the ABS is between about 30 nm and about 150 nm.

In one embodiment of the invention, the WP 220 may be a tapered write pole. Accordingly, as illustrated in FIG. 2A, the WP 220 may include a tapered surface 271 which increases a width of the WP 220 from a first width W1 at the ABS to a second width W2 away from the ABS. In one embodiment, the width W1 may be between around 60 nm and 200 nm, and the width W2 may be between around 120 nm and 350 nm.

The WP 220 may be tapered at the surface 271 to improve magnetic performance. For example, by reducing the width W1 at the ABS may concentrate a magnetic field generated by the WP 220 over desirable portions of the magnetic disk 202. In other words, reducing the width W1 of the WP 220 at the ABS reduces the probability that tracks adjacent to a desirable track are erroneously altered during writing operations.

While a small width of the WP 220 is desired at the ABS, it may be desirable to have a greater width of the WP 220 in areas away from the ABS. A larger width W2 of the WP 220 away from the ABS may desirably increase the magnetic flux to the WP 220, by providing a greater thickness of the WP 220 in a direction generally parallel to the ABS. In operation, write current passes through coil 218 and induces a magnetic field (shown by dashed line 228) from the WP 220 that passes through the RL 204 (to magnetize the region of the RL 204 beneath the WP 220), through the flux return path provided by the EBL 206, and back to an upper return pole 250. In one embodiment, the greater the magnetic flux of the WP 220, the greater is the probability of accurately writing to desirable regions of the RL 204.

FIG. 2A further illustrates one embodiment of the upper return pole or magnetic shield 250 that is separated from WP 220 by a nonmagnetic gap layer 256. In some embodiments, the magnetic shield 250 may be a trailing shield wherein substantially all of the shield material is on the trailing end 203. Alternatively, in some embodiments, the magnetic shield 250 may be a wrap-around shield wherein the shield covers the trailing end 203 and also wraps around the sides of the write pole 220. As FIG. 2A is a cross section through the center of the read/write head 200, it represents both trailing and wrap-around embodiments.

Near the ABS, the nonmagnetic gap layer 256 has a reduced thickness and forms a shield gap throat 258. The throat gap width is generally defined as the distance between the WP 220 and the magnetic shield 250 at the ABS. The shield 250 is formed of magnetically permeable material (such as Ni, Co and Fe alloys) and gap layer 256 is formed of nonmagnetic material (such as Ta, TaO, Ru, Rh, NiCr, SiC or $Al_2O_3$). A taper 260 in the gap material provides a gradual transition from the throat gap width at the ABS to a maximum gap width above the taper 260. This gradual transition in width forms a tapered bump in the non-magnetic gap layer that allows for greater magnetic flux density from the write pole 220, while avoiding saturation of the shield 250.

It should be understood that the taper 260 may extend either more or less than is shown in FIG. 2A. The taper may extend upwards to an end of shield 250 opposite the ABS (not shown), such that the maximum gap width is at the end of the shield opposite the ABS. The gap layer thickness increases from a first thickness (the throat gap width) at the ABS to greater thicknesses at a first distance from the ABS, to a greatest thickness at a second distance (greater than the first distance) from the ABS.

FIG. 2B shows an enlarged side view of the WP 220 of FIG. 2A, with the shield layer 250 and the gap layer 256 removed to show details of the WP 220, according to an embodiment of the invention. The WP 220 includes flared sides 274, which extend from the flare point 222 away from the ABS, such that the main pole increases from a first thickness $T_1$ to greater thicknesses in a direction away from the ABS.

In some embodiments, the first thickness, $T_1$ is between 20 nm and 150 nm. The flared sides 274 form an angle α with respect to a plane parallel to the ABS surface. In one embodiment α is between about 30° and about 60°. The flare point 222 may be between about 30 nm and about 275 nm from the ABS.

Figure 3:
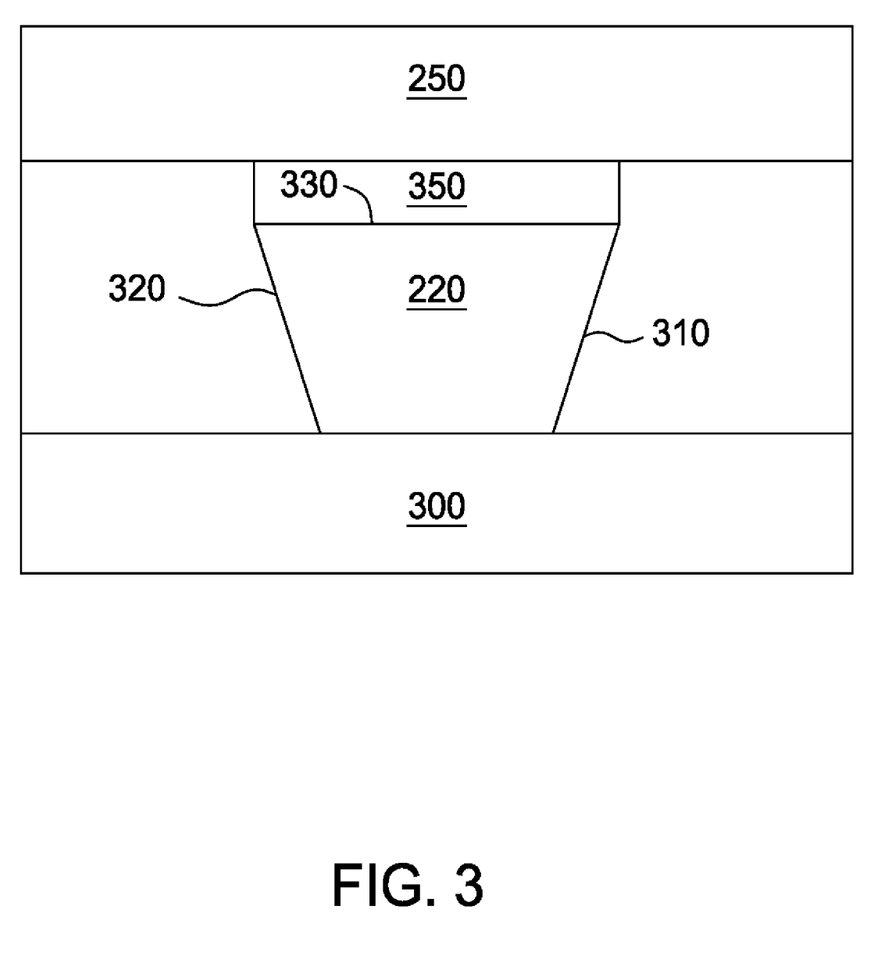
FIG. 3 is an air bearing surface (ABS) view of a write head, according to an embodiment of the invention.

FIG. 3 illustrates an ABS view of the WP 220, according to an embodiment of the invention. As illustrated in FIG. 3, the WP 220 may be formed on a substrate 300. The substrate 300 may include one or more components of the magnetic recording head such as, for example, the read head, one or more magnetic coils, and the like, formed therein. In one embodiment, the WP 220 may have a substantially trapezoidal cross section, as illustrated in FIG. 3. FIG. 3 also illustrates a gap layer 350 formed along a top surface 330 of the WP 220. A shield 250 may be formed on the gap layer 350, as further illustrated in FIG. 3. While a top shield 250 is illustrated in FIG. 3, in alternative embodiments, the shield 250 may wrap around the WP 220, wherein the gap layer 350 separates the shield 250 from the sidewall portions of the WP 220.

Figure 4A:
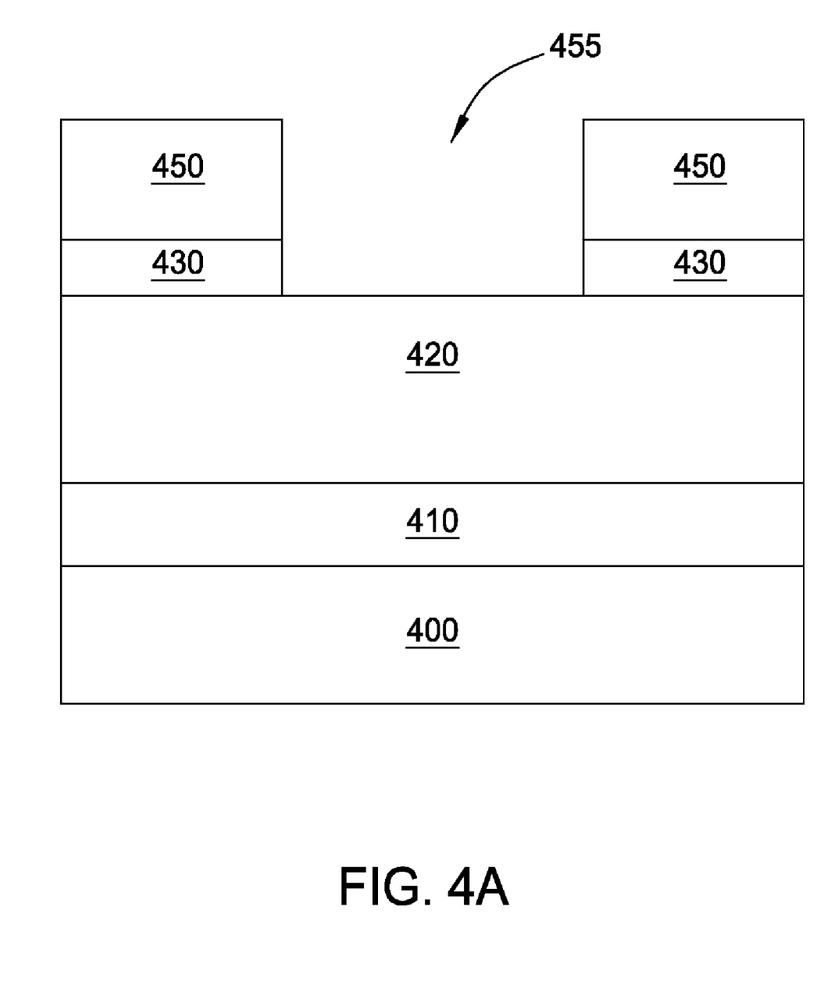
FIGS. 4A-D illustrate exemplary steps for fabricating a write head illustrated in FIG. 3, according to an embodiment of the invention.

In one embodiment of the invention the WP 220 may be formed using a damascene process. FIGS. 4A-D illustrate an exemplary damascene process, according to an embodiment of the invention. As illustrated in FIG. 4A, the damascene process may begin by providing a substrate 400 comprising a stop layer 410, a side gap layer 420, and patterned etch mask layers 430 and 450 formed thereon. In one embodiment, a combination of the substrate 400 and stop layer 410 may correspond to the substrate 300 illustrated in FIG. 3.

The first stop layer 410 may be formed with one or more of Tantalum, Tantalum Nitride, Titanium, Titanium Nitride, Ruthenium, Nickel Chromium, and Chromium. The gap layer 420 may be formed with a suitable non-magnetic material such as, for example, silicon nitride, alumina, or the like. The etch mask layer 430 may also be formed with one or more of Tantalum, Tantalum Nitride, Titanium, Titanium Nitride, Silicon Carbide, or the like.

The etch mask layer 450 may be formed with one or more of Tantalum, Tantalum Nitride, Titanium, Titanium Nitride, Chromium, Nickel Chromium, Ruthenium, or the like. While a single etch mask layer 450 is shown in FIG. 4A, in alternative embodiments, the etch mask layer 450 may include a plurality of hard mask layers. As illustrated in FIG. 4A, the etch mask layers 430 and 450 may define an opening 455.

Figure 4B:
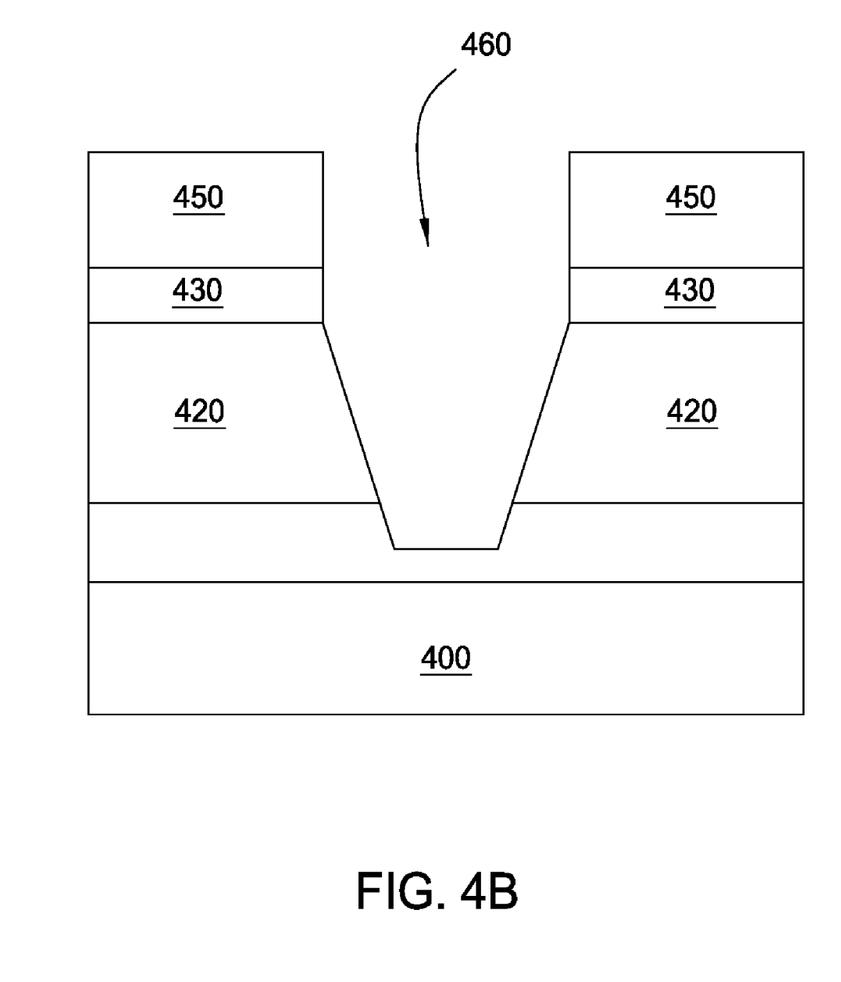

In one embodiment, a trench 460 may be opened in the stop layer 430, the non-magnetic layer 420, and at least a portion of the etch stop layer 410 through the opening in the etch mask layers 430 and 450 using ion beam etching (IBE) or Reactive Ion Etching (RIE). As illustrated in FIG. 4B, the trench 460 may have a substantially trapezoidal cross section in which a write pole may be formed.

Figure 4C:
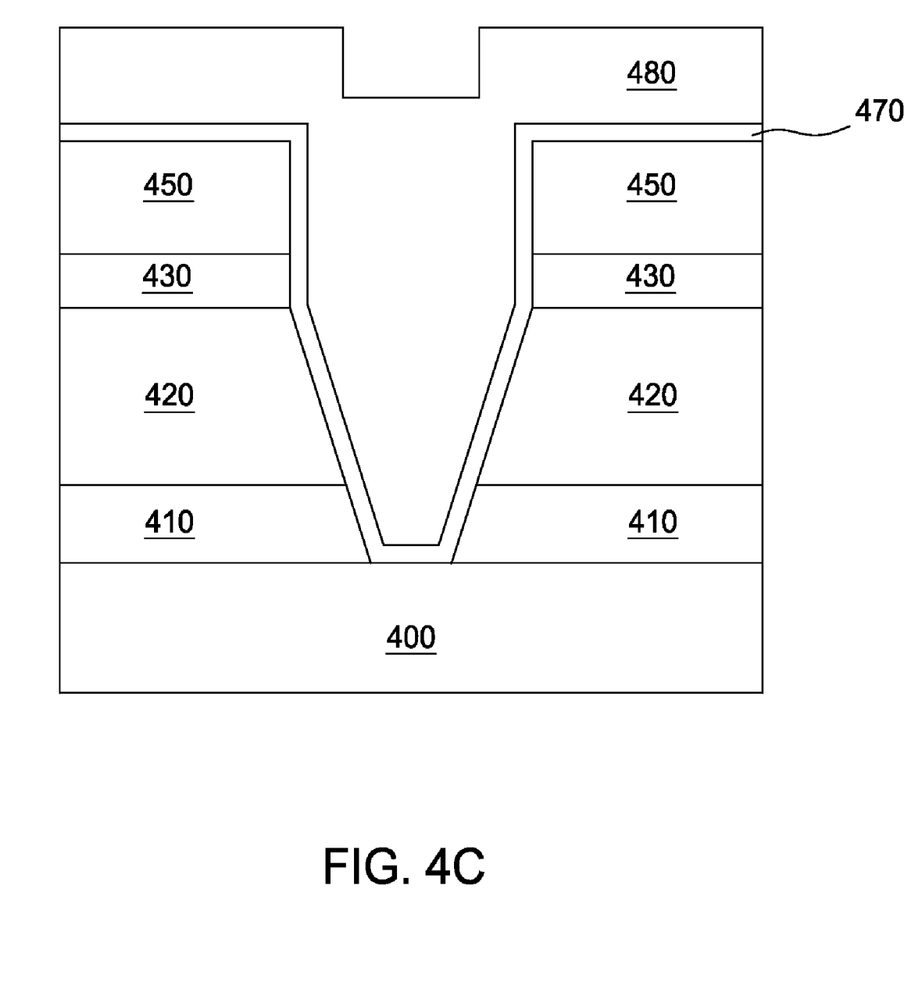
Figure 4D:
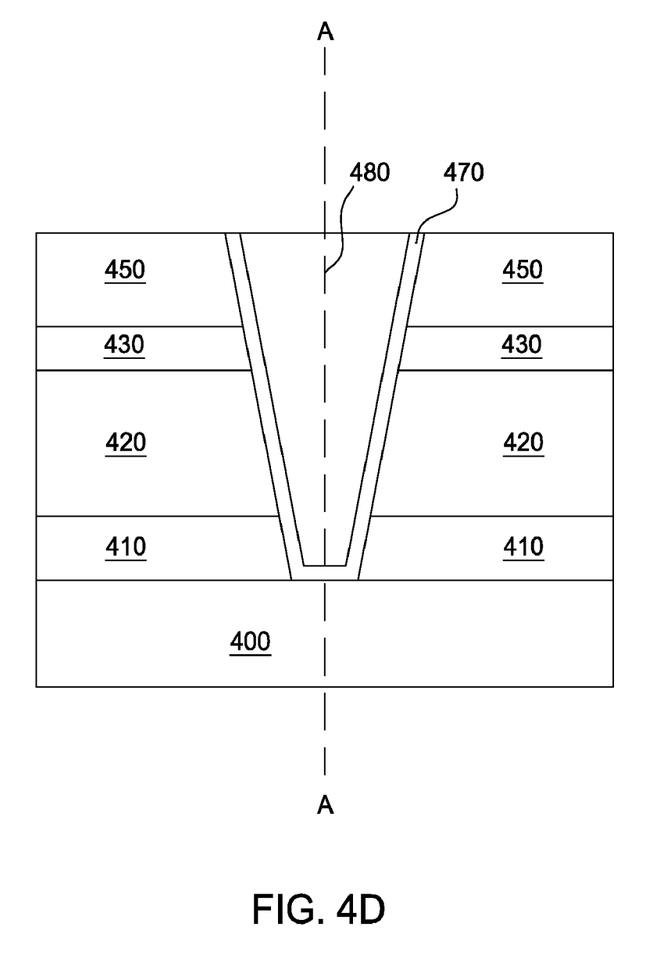

In one embodiment, forming the write pole may involve depositing a seed layer 470 on the sides of the trench 460, as illustrated in FIG. 4C. The seed layer may be formed with Ruthenium, in one embodiment. As further illustrated in FIG. 4C ferromagnetic layer 480 may be deposited in the trench 460 using for example, electroplating. In one embodiment, the ferromagnetic layer may include a plurality of different electromagnetic materials such as, for example, Cobalt-Iron, Cobalt-Nickel-Iron, and Nickel-Iron. Finally, a Chemical-Mechanical Polishing step CMP, may be performed to remove undesired portions of the seed layer 470 and the ferromagnetic layer 480, thereby forming the write pole 220. The resulting structure is illustrated in FIG. 4D.

After the damascene process described hereinabove with reference to FIGS. 4A-D, one or more further processing steps may be performed to form the tapered portion 271 of the write pole 220 and the gap layer 256 (see FIG. 2A). FIGS. 5A-G illustrate further processing steps that may be performed during fabrication of write head, according to an embodiment of the invention. In particular, FIGS. 5A-G illustrate a cross sectional views through the plane A-A illustrated in FIG. 4D.

Figure 5A:
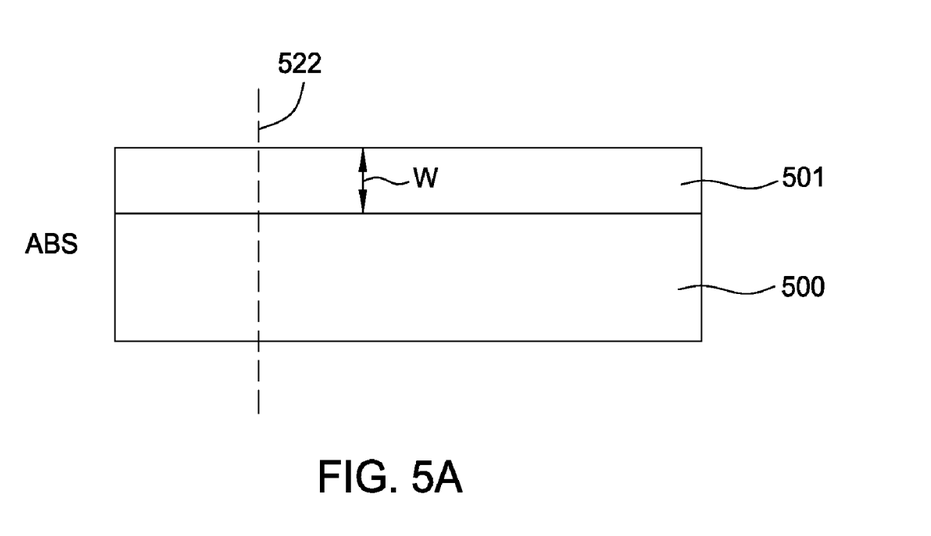
FIGS. 5A-G illustrate exemplary steps for fabricating a tapered write pole with a non-magnetic front bump layer, according to an embodiment of the invention.

As illustrated in FIG. 5A, fabrication of the magnetic head may begin by providing a substrate 500 on which a write pole 501 has been formed. The write pole 501 may correspond to the write pole 220 described hereinabove. In one embodiment, the write pole 501 may be a single layer formed with the same magnetic materials. However, in alternative embodiments, the write pole 501 may include a plurality of layers of different magnetic materials. In some embodiments, magnetic pole layer 501 may include a lamination of magnetic layers that are separated by one or more non-magnetic layers. The magnetic pole 501 may be composed of any suitable magnetic materials, for example, iron, nickel, cobalt, and the like, or a combination thereof. In one embodiment of the invention, the thickness of the magnetic pole layer 501 may correspond to the width W2 illustrated in FIG. 2A, which is between around 120 nm and 350 nm.

In one embodiment, the substrate 500 may include one or more components of a magnetic head, for example, a read head portion 211, already formed therein using conventional techniques. The substrate 500 may also include one or more portions of a write head, for example the main pole 212, embedded coils 218, or the like (not shown in FIG. 5A) that are already formed therein. As discussed above, the magnetic pole 501 may be a flared magnetic pole. Accordingly, the magnetic pole 501 may flare away from the ABS in a direction into and out of the page, beginning from a flare point 522 illustrated in FIG. 5A.

Figure 5B:
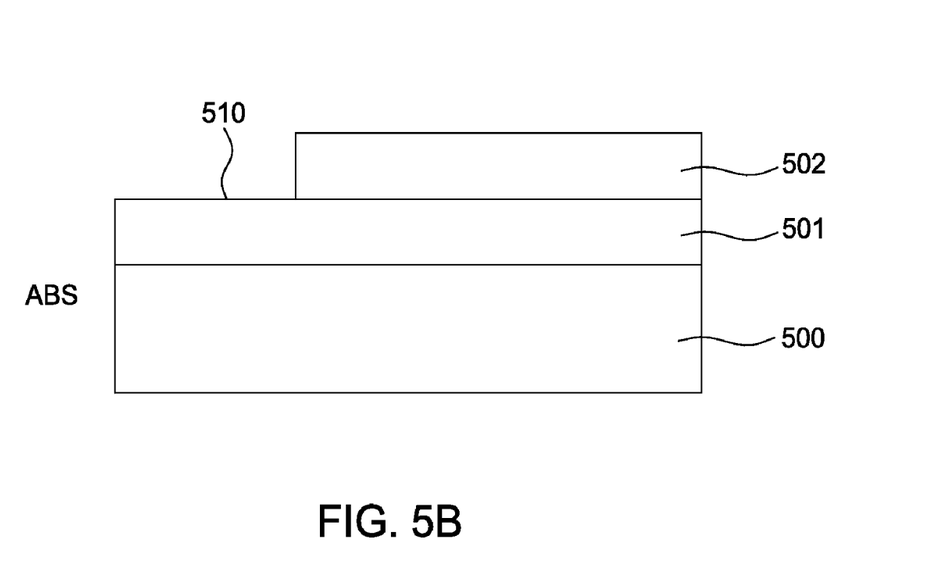

In one embodiment of the invention a non-magnetic layer 502 may be patterned on the magnetic pole 501, as illustrated in FIG. 5B. Patterning the non-magnetic layer 502 may involve, for example, depositing a layer of non magnetic material, and then patterning a photoresist layer on top of the non-magnetic layer to expose portions of the non-magnetic layer that are to be removed. Thereafter, one or more portions of the non-magnetic layer 502 may be removed using a suitable technique such as milling, etching, or the like.

The non-magnetic layer 502 may be formed with any suitable material such as, for example, aluminum oxide, Ruthenium, Tantalum, Silicon-Carbide, Nickel-Chrome, Chrome, or a combination thereof. In one embodiment of the invention, the non-magnetic layer 502 may be formed by depositing several layers of one or more of the above listed materials. The thickness of the non-magnetic layer 502 may be between around 100 nm and 500 nm, in one embodiment.

Figure 5C:
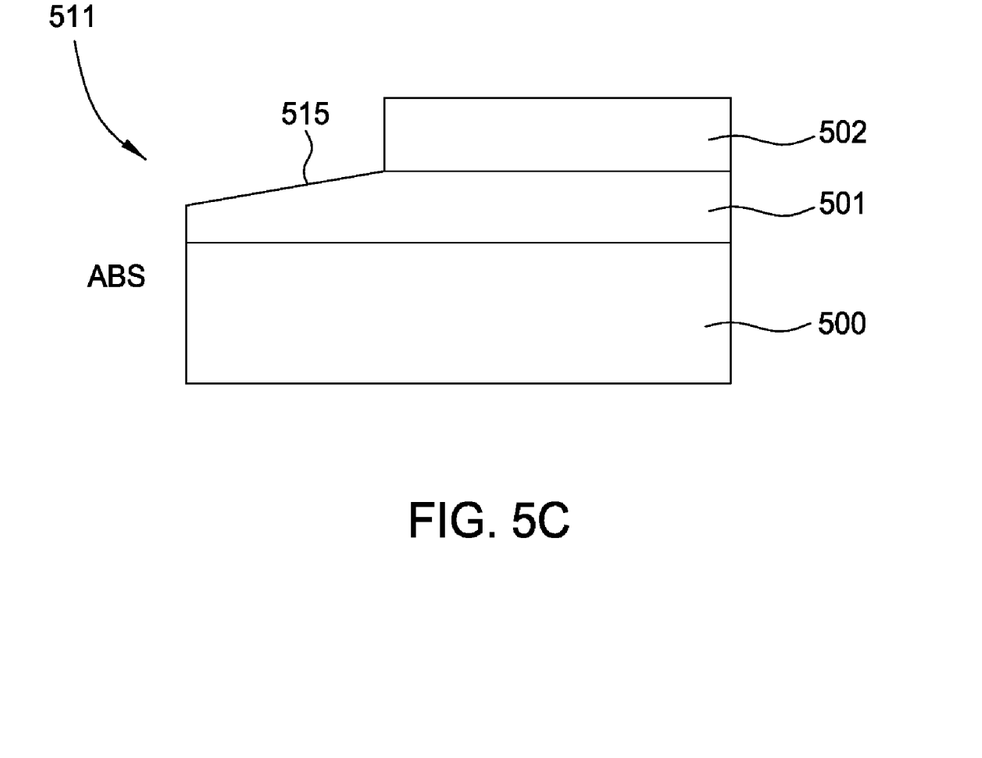

As illustrated in FIG. 5B, the non-magnetic layer 502 may expose a surface 510 of the magnetic pole 501. In one embodiment of the invention, a milling process may be used to shape the exposed surface 510 of the magnetic pole layer to form a tapered magnetic pole 501, as illustrated in FIG. 5C. During the milling process, the non-magnetic layer 502 may prevent portions of the magnetic pole layer 501 thereunder from being removed, thereby forming the tapered surface 515 at or near the ABS position 511 of the magnetic pole 501. The position 511 corresponds to an air bearing surface (ABS) end of the write head. As illustrated in FIG. 5C, the tapered magnetic pole 501 may include a tapered surface 515. The width of the tapered pole 501 at the ABS end 511 may correspond to the width W1 illustrated in FIG. 2A, which is between around 60 nm and 200 nm. In one embodiment of the invention, the taper angle β may be between around 20 degrees and 45 degrees.

Figure 5D:
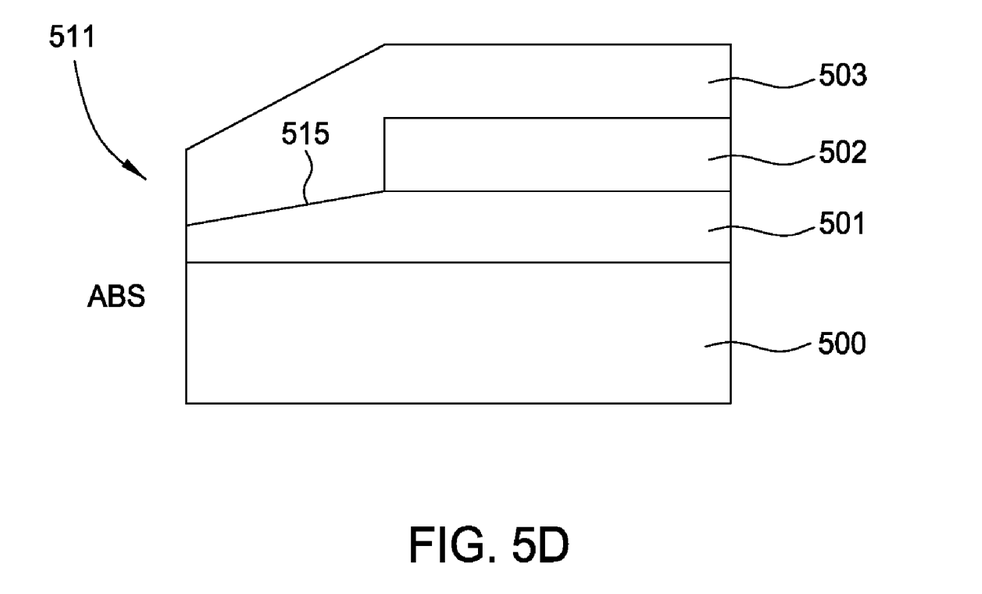

In one embodiment of the invention, after forming the tapered surface 515, a second non-magnetic layer 503 may be deposited on the non-magnetic layer 502 and the tapered surface 515 of the magnetic pole 501, as illustrated in FIG. 5D. The second non-magnetic layer 503 may be formed with any suitable non-magnetic material. In a particular embodiment, the non-magnetic layer 503 may be formed with aluminum oxide, silicon dioxide, Silicon Nitride, Silicon Carbide, Nickel Chromium, Chromium, or the like. Any suitable deposition technique may be used to deposit the non-magnetic layer 503. Exemplary deposition techniques may include, for example, sputtering, chemical vapor deposition, and the like.

Figure 5E:
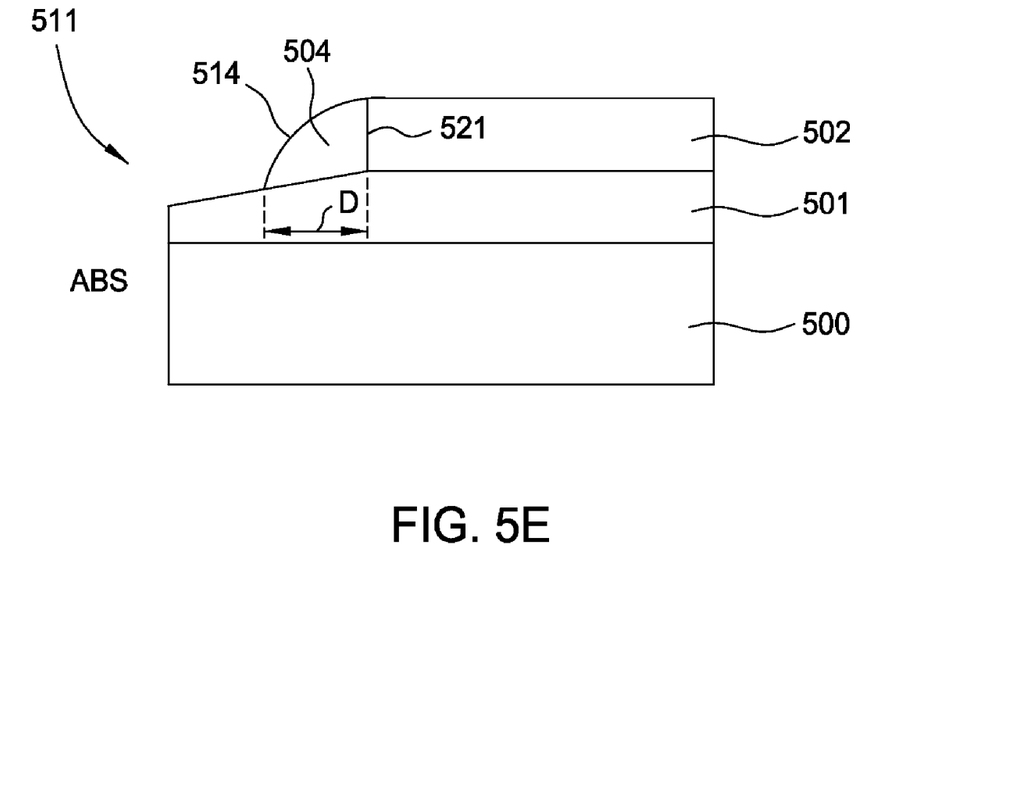

A second milling step may thereafter be performed to shape the second non-magnetic layer 503 into a bump layer 504, as illustrated in FIG. 5E. The bump layer 504 may be formed on a portion of the tapered surface 515 of the write pole 501 that is away from the ABS end 511. Further, as illustrated in FIG. 5E, the bump layer may be adjacent to a sidewall portion 521 of the non-magnetic layer 502, in one embodiment. In one embodiment, the width D of the bump layer may be between 40 nm and 250 nm.

While the bump layer 504 is shown having a curved surface 514 in FIG. 5E, the bump layer may have any reasonable shape in alternative embodiments. For example, in some embodiments, the bump layer 504 may have a straight surface beginning at the top of the non-magnetic layer 502 and extending to the tapered surface 515 of the write pole 501. In further embodiments, the bump layer 504 may have an uneven surface extending from the top of the non-magnetic layer 502 and extending to the tapered surface 515 of the write pole 501.

Figure 5F:
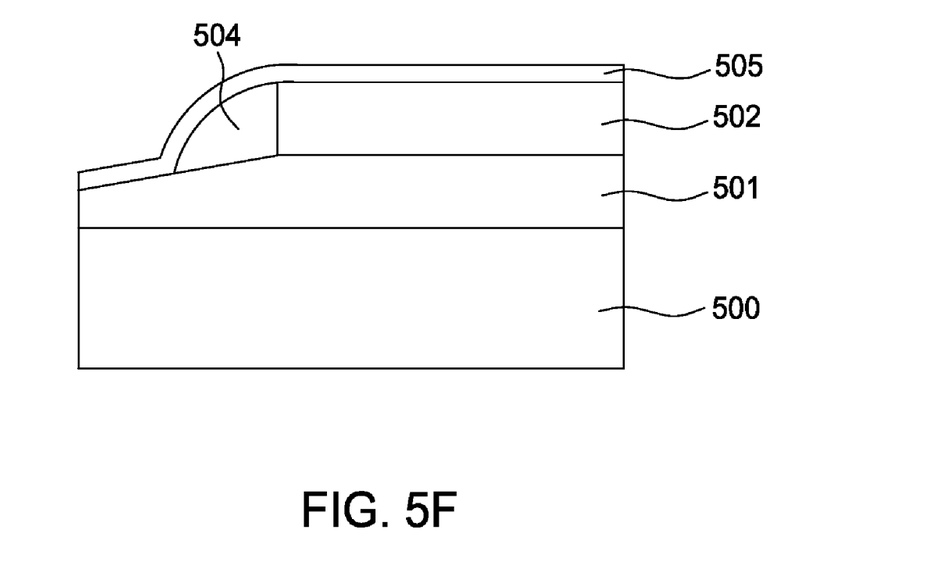

In one embodiment, a third non-magnetic layer 505 may be deposited on the exposed surfaces of the magnetic pole 501, bump layer 504 and the non-magnetic layer 502. The third non-magnetic layer 505 may be formed with any suitable non-magnetic material, for example, aluminum oxide, Ruthenium, Tantalum, Silicon-Carbide, Nickel-Chrome, Chrome, or a combination thereof. In one embodiment of the invention, the thickness of the third non-magnetic layer 505 may be between around 15 nm and 35 nm.

Figure 5G:
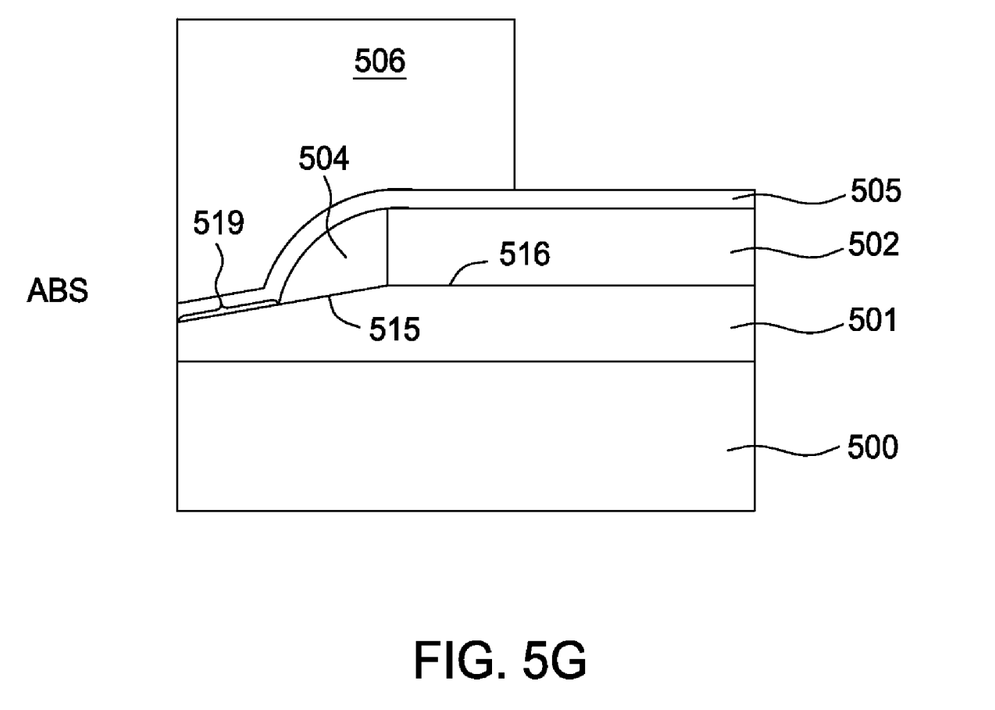

After forming the third non-magnetic layer 505, a shield layer 506 may be patterned on the non-magnetic layer 505 using conventional techniques, as illustrated in FIG. 5G. In one embodiment of the invention, the shield layer 506 may be a trailing shield layer. The shield layer 506 may be formed over the tapered surface 515 of the write pole 501 as illustrated in FIG. 5G. In some embodiments, a portion of the shield layer 505 may also be formed over a non-tapered surface 516 of the write pole 501. The shield layer may be formed with any suitable metal or metal alloy, for example, NiFe. In one embodiment, the width V1 of the shield layer 506 at the ABS may be between around 200 nm and 1100 nm, and the width V2 of the shield layer 506 over the surface 516 may be between around 100 nm and 1000 nm.

The combination of the first non-magnetic layer 502, bump layer 504, and the third non-magnetic layer 505 may correspond to the gap layer 256 illustrated in FIG. 2A. As described above, the first non-magnetic layer 502 may be used as a mask during fabrication of the write pole 501. In particular, the first non-magnetic layer 502 may be used as a mask during a milling process to define a tapered surface 515 of the write pole 501.

The bump layer 504 may provide further separation between the shield layer 506 and the tapered portion of the write pole 501. Greater separation between the write pole 501 and the shield layer 506 near the ABS results in an improved write field gradient which, in turn, results in a lower bit error rate during write operations of the write head. Specifically, an improved write field gradient reduces the possibility that tracks adjacent to a desired track are altered during write operations.

The third non-magnetic layer 505 may separate the shield layer 506 from the write pole 501 at or near the ABS. For example, FIG. 5G illustrates a portion 519 of the tapered surface 515 of the write pole 501 that is not covered by the bump layer 504. The third non-magnetic layer 505 may separate the shield layer 506 from the portion 519 of the write pole 501. The third non-magnetic layer 505 may also provide additional separation between the write pole 501 and the shield layer 506 over remaining portions of the write pole 501, as illustrated in FIG. 5G.

While the third non-magnetic layer 505 is shown over the portion 519, the bump layer 504 and the first non-magnetic layer 502, in an alternative embodiment, the third non-magnetic layer may be formed only on the portion 519 or on the portion 519 and the bump layer 504.

By providing a front bump layer that provides a greater separation distance between a write pole and a shield layer near a tapered portion of the write pole, embodiments of the invention greatly improve the performance of magnetic write heads.

While the foregoing is directed to embodiments of the present invention, other and further embodiments of the invention may be devised without departing from the basic scope thereof, and the scope thereof is determined by the claims that follow.

What is claimed is:

1. A method of fabricating a magnetic head, comprising:
    forming a write pole on a substrate;
    patterning a first non-magnetic layer on the write pole, wherein the first non-magnetic layer exposes a portion of the write pole proximate an air bearing surface (ABS) end of the magnetic head;
    removing the exposed portion of the write pole to form a tapered region of the write pole, wherein the thickness of the tapered region of the write pole increases in a direction away from the ABS;
    depositing a second non-magnetic layer on at least part of the tapered region of the write pole; and
    patterning the second non magnetic layer to form a non-magnetic bump layer, wherein the bump layer is adjacent to a portion of the tapered region and a sidewall portion of the first non-magnetic layer.

2. The method of claim 1, further comprising:
    depositing a third non-magnetic layer on a portion of the tapered region of the write pole that remains exposed after forming the bump layer; and
    forming a shield layer, wherein the shield layer is separated from the magnetic pole by at least the third non-magnetic layer and the bump layer.

3. The method of claim 2, wherein the shield layer is formed as a trailing shield layer.

4. The method of claim 1, wherein the bump layer comprises at least one of: aluminum oxide, silicon dioxide, silicon nitride, silicon carbide, chromium, and nickel chromium.

5. The method of claim 1, wherein the tapered region of the write pole comprises a tapered surface, wherein the tapered surface has an angle between 20 degrees and 45 degrees from a direction normal to the ABS.

6. The method of claim 1, wherein the bump layer has a thickness between 40 nm and 250 nm.

7. The method of claim 1, wherein the write pole has a maximum thickness between 120 nm and 350 nm, and a minimum thickness between 60 nm and 200 nm at the ABS.

8. The method of claim 1, wherein the bump player has a curved surface extending from a top surface of the first non-magnetic layer to the tapered region of the write pole.

9. A method for fabricating a magnetic head, comprising:
    patterning a flared write pole on a substrate using a damascene process, the write pole comprising a flare point, wherein a width of the write pole increases from a first width to a greater widths in a direction away from an air bearing surface (ABS) end of the magnetic head;
    patterning a first non-magnetic layer on the write pole, wherein the first non-magnetic layer exposes a portion of the write pole proximate the ABS end;
    removing the exposed portion of the write pole to form a tapered region of the write pole, wherein the thickness of the tapered region of the write pole increases in a direction away from the ABS;
    depositing a second non-magnetic layer on at least part of the tapered region of the write pole; and
    patterning the second non magnetic layer to form a bump layer, wherein the bump layer is adjacent to a portion of the tapered region and a sidewall portion of the first non-magnetic layer.

10. The method of claim 9, further comprising:
    depositing a third non-magnetic layer on a portion of the tapered region of the write pole that remains exposed after forming the bump layer; and
    forming a shield layer, wherein the shield layer is separated from the magnetic pole by at least the third non-magnetic layer and the bump layer.

11. The method of claim 10, wherein the shield layer is formed as a trailing shield layer.

12. The method of claim 9, wherein the bump layer comprises at least one of: aluminum oxide, silicon dioxide, silicon nitride, silicon carbide, chromium, and nickel chromium.

13. The method of claim 9, wherein the bump layer has a thickness between 40 nm and 250 nm.

14. The method of claim 9, wherein the bump player has a curved surface extending from a top surface of the first non-magnetic layer to the tapered region of the write pole.

15. A magnetic head, comprising:
    a write pole comprising a tapered region and a non-tapered region, wherein a thickness of the tapered region of the write pole increases in a direction away from an air bearing surface (ABS) end of the magnetic head;
    a first non-magnetic layer formed on the non-tapered region of the magnetic pole;
    a non-magnetic bump layer formed on the tapered region, wherein the non-magnetic bump layer is adjacent to a sidewall portion of the first non-magnetic layer;
    a second non-magnetic layer formed on a portion of the tapered region of the write pole that is not covered by the bump layer; and
    a shield layer, wherein the shield layer is separated from the write pole by at least the second non-magnetic layer and the bump layer.

16. The magnetic head of claim 15, wherein the bump layer comprises at least one of: aluminum oxide, silicon dioxide, silicon nitride, silicon carbide, chromium, and nickel chromium.

17. The magnetic head of claim 15, wherein the tapered region of the write pole comprises a tapered surface, wherein the tapered surface has an angle between 20 degrees and 45 degrees from a direction normal to the ABS.

18. The magnetic head of claim 15, wherein the bump layer has a thickness between 40 nm and 250 nm.

19. The magnetic head of claim 15, wherein the write pole has a maximum thickness between 120 nm and 350 nm, and a minimum thickness between 60 nm and 200 nm at the ABS.

20. The magnetic head of claim 15, wherein the bump player has a curved surface extending from a top surface of the first non-magnetic layer to the tapered region of the write pole.

* * * * *